E. E. WAITE.
BEARING MATERIAL.
APPLICATION FILED MAR. 20, 1915.

1,398,926. Patented Nov. 29, 1921.

WITNESSES  
INVENTOR  
Edwin E. Waite

UNITED STATES PATENT OFFICE.

EDWIN E. WAITE, OF FRAMINGHAM, MASSACHUSETTS, ASSIGNOR, BY MESNE ASSIGNMENTS, OF ONE-HALF TO MULTICOLOR COMPANY, OF FRAMINGHAM, MASSACHUSETTS.

BEARING MATERIAL.

1,398,926.    Specification of Letters Patent.    Patented Nov. 29, 1921.

Application filed March 20, 1915. Serial No. 15,944.

*To all whom it may concern:*

Be it known that I, EDWIN E. WAITE, a citizen of the United States, residing at Framingham, in the county of Middlesex and State of Massachusetts, have invented certain new and useful Improvements in Bearing Materials, of which the following description, in connection with the accompanying drawings, is a specification, like reference characters on the drawings indicating like parts in the several figures.

This invention relates to bearing materials, such for example as bearing bushings and linings, piston rings, etc. These materials usually are made from metals of some kind but, as is well known, such metals can stand only moderately high temperatures without undergoing some changes in physical condition which impair their value for these purposes; that is, Babbitt-metal, for instance, becomes soft and melts at a temperature often, although usually accidentally, attained in bearings, and all these metals expand upon a rise in temperature and tend to seize the journal. Consequently, it is necessary to give such bearings careful attention or else to employ special apparatus to keep them in proper running condition. Under some conditions of service, however, it is very difficult to give this attention or utilize these special appliances and these conditions have created a demand for a bearing material that will stand more severe service than those in common use. The present invention aims to devise a new material of this character which will avoid the objections that have been found to exist in using metals, and to devise a method of producing a satisfactory material of this character. The invention is particularly concerned with the use of asbestos in the solution of these problems.

In the accompanying drawings.

Figure 1:
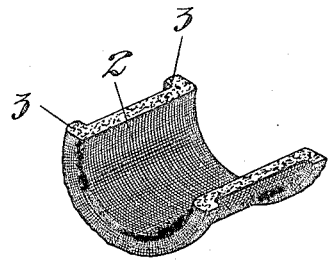
Figure 1 is a perspective view of one-half of a split bushing adapted to be used in a bearing and constructed in accordance with this invention.

In making the material shown I prefer to use an abestos fabric which preferably is woven from asbestos yarn of a character readily obtainable on the market. This yarn usually has a very small percentage of cotton which acts as a binder for the asbestos fiber and has a wire reinforcement to give the yarn the desired tensile strength. A fabric may be woven from this yarn of any thickness or width ordinarily required for a bearing material.

The fabric or the yarn from which the fabric is woven preferably is soaked in a binding and anti-friction compound designed to bind the fibers of asbestos firmly together and also to give the material the coefficient of friction required. It is obvious that a great many materials may be used for this purpose and that the particular formula used will depend largely upon the uses to which any particular fabric is to be put. One formula which produces satisfactory results for general purposes is made by thinning two pounds of saponified Lima oil with a gallon of naphtha and adding about ten per cent. of boiled linseed oil; but paraffin may be used instead of this oil or linseed oil may be used alone. A great variety of substances will suggest themselves to those skilled in this art as suitable for this purpose. It will, of course, be understood that the term "anti-friction compound" does not necessarily designate a lubricating material but rather some material which can be used on the asbestos fabric to reduce its coefficient of friction. If the fabric is first woven before being treated with this compound, it is desirable to subject it to the action of steam at sufficient pressure, say sixty or seventy pounds, to drive the compound into the body of the fabric. Preferably, however, this compound is applied to the yarn before it is woven into a fabric by running the yarn through a bath of the preparation during the weaving operation. In either case the fabric is thoroughly impregnated with this substance.

The fabric is next calendered and is then molded to give it the shape and bearing value required for the use to which it is to be put. This material is then baked, starting at the ordinary temperatures and slowly increasing the temperature to a point such that a hard, firm surface on the fabric is produced. Preferably this temperature is carried to a point somewhat higher than the maximum temperature to which the material will be subjected in use. For the purposes of an ordinary bearing the temperature should be run up to from two hundred and fifty to three hundred degrees Fahr., while if the material is to be used for a piston ring, this temperature should be carried up to about five hundred degrees Fahr. The temperature obviously will vary with the requirements of each individual case and with the nature of the composition in which the fabric is impregnated before baking, but the temperature should be high enough to drive out all the vaporizable matter that will be given off at the maximum temperature that the material will have to stand while in use. The baking operation gives to the material a very hard consistency, the fibers being bound together so thoroughly as to make a body having a bearing value or an ability to resist distortion sufficient for any ordinary service required of bearing materials and also having a very low co-efficient of friction. The article may now be molded again since it may have warped in the baking operation.

A bushing or other article made in this way could be used without further treatment; but inasmuch as it would absorb a certain quantity of oil when first used and since it is desirable for many purposes to have the bushing self lubricating to a certain extent, I prefer to boil the bushing or other article in an oil of a character that will be used on it for lubricating purposes; that is, if the bushing is to be used in the bearing, I would prefer to boil it in a good machine oil; while if it were to be used for piston rings, it should be boiled in cylinder oil; and if for self-lubricating bushings, such as those used in automobiles as bearings for levers, lever rods, spring shackles, etc., it should be boiled in a heavy lubricating grease. Whatever oil or grease is used for this purpose I prefer to carry the temperature up nearly to the flash point while the material is immersed in it so that the material will be thoroughly saturated with the lubricant. While the material, after being baked, is oil proof in the sense that it is not softened by oil and does not swell or change dimensions substantially when subjected to the action of oil, still it has capillary spaces which take up oil when treated in the manner just described. Of course the quantity of oil absorbed in this manner will vary somewhat with the pressure used in the calendering and molding operations.

Figure 2:
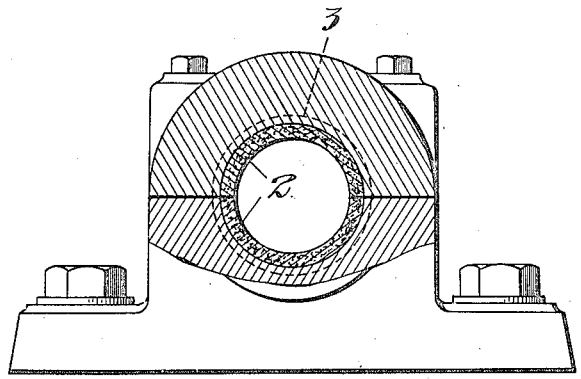
Fig. 2 is a cross-sectional view of a bearing lined with a bushing like that shown in Fig. 1.

In Figs. 1 and 2 of the drawings, one-half of a split bushing of the ordinary form, but made in accordance with this invention, is indicated at 2. This bushing is shaped to be used in a bearing of the ordinary construction, as shown in Fig. 2, in place of the usual bronze or brass bushing or Babbitt lining. The flanges 3, which are usually formed on bushings of this character, may be formed in a bushing made according to the process above described, either by molding, or the fabric from which the bushing is made may be made in a channel section that is with the flanges woven in place, so that it is merely necessary to mold a portion of the fabric on a radius, in order to produce the bushing shown in Fig 1.

Figure 3:
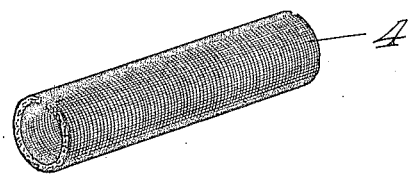
Fig. 3 is a perspective view of another form of a bearing bushing embodying the invention.

A slightly different construction is shown in Fig. 3 in which the fabric has been molded into a tubular form to make a bushing of the type that is driven into a bearing. Similar bushings can also be made by wrapping a narrow strip of fabric spirally into the form of a tube and cutting this tube into the required lengths. Bushings of the type shown in Fig. 3 preferably are given an external coating of baking enamel prior to the baking operation above described so that they will have an exceedingly hard outside surface. A bushing of either construction shown in the drawings can be reamed after it has been inserted in the bearing in the same way that metal bushings are reamed. The particular form given to the material will, of course, be determined by the use to which it is to be put.

I have found that bearing linings made up in the manner above described will operate satisfactorily at temperatures which would render permanently useless an ordinary bearing lining or bushing. This property appears to be due to the ability of asbestos to withstand very high temperatures without undergoing any substantial changes in physical characteristics and to the fact that the treatment above described greatly increases the firmness or mechanical strength of the material and enables it to withstand the action of hot lubricating oils. The material undergoes no substantial changes in dimensions or consistency even at very high operating temperatures. Since all the vaporizable materials are driven out in the baking operation there is nothing left in the bushing to soften up and increase the friction when the bushing gets hot. This material is also applicable where self-lubricating bushings, washers, etc., are required and such articles made from it can be used satisfactorily in many places where the corresponding metal parts would require grease or oil cups to supply lubricant to the friction surfaces.

In speaking of high operating temperatures, or the maximum working temperature, or the maximum working temperature to which the bearing material will be subjected while in use, it will of course be understood that while the temperatures referred to are relatively high still they are temperatures at which it is reasonable to expect the shaft or other device to operate.

Having thus described my invention, what

I claim as new and desire to secure by Letters Patent of the United States is:

1. A bearing member of the character described, consisting of asbestos fabric, molded to the required shape and impregnated with binding material giving it a hard consistency enabling it to withstand the action of lubricating oils at high operating temperatures without softening appreciably.

2. A bearing member of the character described consisting of asbestos fabric shaped to receive a shaft or the like and impregnated with binding material giving it a hard consistency, and having a flange structurally integral therewith at one end thereof.

3. A bearing member of the character described, consisting of asbestos fabric, molded to the required shape, impregnated with binding material giving it a hard consistency and free from all materials vaporizable at high operating temperatures.

4. An article of the character described, consisting of asbestos fabric impregnated with binding and anti-friction material, baked to a hard consistency and containing lubricating material.

5. An article of the character described, consisting of a piece of asbestos fabric of the required shape impregnated with substances serving to give it a low coefficient of friction and to bind the fibers firmly together and form a hard body capable of withstanding the action of hot lubricating oils without softening.

6. A bearing member of the character described, consisting of a piece of asbestos fabric molded to the required shape, impregnated with binding material giving said member a hard consistency capable of withstanding the action of hot lubricating oils in a bearing without softening appreciably and containing lubricating material.

7. A bearing material of the character described, consisting of asbestos fabric impregnated with binding material and subjected to a high temperature to free it from matter vaporizable at high operating temperatures and containing lubricating material.

8. A bearing lining of asbestos fabric woven in channel section and impregnated with anti-friction material.

9. That improvement in the art of making bearing materials which consists in impregnating a piece of asbestos material of the required shape with a binder, driving out of said material the matter that would vaporize at the maximum working temperature to which the material is to be subjected, and saturating said material with a lubricant.

10. That improvement in the art of making bearing materials which consists in impregnating a piece of asbestos fabric with a binding and anti-friction compound capable of giving the material a low coefficient of friction, and baking said material at a temperature higher than the temperature to which it will be subjected while in use.

11. That improvement in the art of making bearing materials which consists in impregnating a piece of asbestos fabric with a binding and anti-friction compound capable of giving the material a low coefficient of friction, baking said material at a temperature higher than the temperature to which it will be subjected while in use and saturating said material with a lubricant.

12. That improvement in the art of making bearing materials which consists in impregnating a piece of asbestos fabric with a compound capable of giving the fabric a low coefficient of friction, said compound containing linseed oil, baking said material at a temperature higher than that to which it will be subjected in use and saturating said material with a lubricant.

13. That improvement in the art of making bearing materials which consists in impregnating a piece of asbestos fabric with a binding and anti-friction compound capable of giving the material a low coefficient of friction, molding said material to the required shape, baking said material at a temperature higher than that to which it will be subjected in use, and soaking said material in a lubricant heated substantially to its flash point.

14. That improvement in the art of making bearing bushings and linings which consists in impregnating a piece of asbestos material with a binder capable of being cured by heat and serving to give said material a very hard consistency, molding said material to the desired shape and heating said material sufficiently to cure said binder and to drive out of said material the matter that would vaporize at the maximum working temperature to which the material is to be subjected while in use.

In testimony whereof I have affixed my signature, in presence of two witnesses.

EDWIN E. WAITE.

Witnesses:
WILLIAM H. VIRGIE,
MABEL CUNNINGHAM.